United States Patent
Goren et al.

(10) Patent No.: US 10,981,723 B2
(45) Date of Patent: Apr. 20, 2021

(54) ROBOTIC INVENTORY HANDLING

(71) Applicant: COMMONSENSE ROBOTICS LTD., Tel Aviv (IL)

(72) Inventors: Elram Goren, Tel Aviv-Jaffa (IL); Eyal Goren, Nes Ziona (IL); Shay Cohen, Shoham (IL); Ori Avraham, Kfar Saba (IL); Guy Blotnick, Tel Aviv (IL); David Grosman, Elad (IL)

(73) Assignee: GET FABRIC LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/596,029

(22) Filed: Oct. 8, 2019

(65) Prior Publication Data

US 2020/0031577 A1 Jan. 30, 2020

Related U.S. Application Data

(62) Division of application No. 15/310,799, filed as application No. PCT/IB2016/053354 on Jun. 8, 2016, now Pat. No. 10,472,172.

(60) Provisional application No. 62/173,130, filed on Jun. 9, 2015.

(51) Int. Cl.
*B65G 1/04* (2006.01)
*B65G 1/137* (2006.01)

(52) U.S. Cl.
CPC ............ *B65G 1/0492* (2013.01); *B65G 1/04* (2013.01); *B65G 1/137* (2013.01); *B65G 1/1378* (2013.01)

(58) Field of Classification Search
None
See application file for complete search history.

(56) References Cited

U.S. PATENT DOCUMENTS

| | | | |
|---|---|---|---|
| 3,746,189 A | 7/1973 | Burch et al. | |
| 6,805,526 B2 * | 10/2004 | Stefani | B65G 1/04 414/278 |
| 7,381,022 B1 * | 6/2008 | King | B65G 1/0492 187/270 |
| 8,721,251 B1 | 5/2014 | Razumov | |

(Continued)

FOREIGN PATENT DOCUMENTS

| | | | |
|---|---|---|---|
| JP | 6040304 A | 3/1985 | |
| JP | 11116006 A | 4/1999 | |

(Continued)

OTHER PUBLICATIONS

Notification of Transmittal of the International Search Report and the Written Opinion issued by the International Searching Authority for corresponding International Patent Application No. PCT/IB2016/053354, dated Sep. 15, 2016.

(Continued)

*Primary Examiner* — Mark C Hageman
(74) *Attorney, Agent, or Firm* — Myers Wolin, LLC

(57) ABSTRACT

An inventory handling system includes multiple shelving units for mounting over a horizontal floor. Each shelving unit contains a vertical array of shelves on which containers are placed. One or more floor robots travel among the shelving units along first paths on the floor. One or more lift robots move independently of the floor robots along second paths in a vertical plane over vertical faces of the shelving units, and transfer the containers between the shelves and the floor robots.

13 Claims, 13 Drawing Sheets

(56) References Cited

U.S. PATENT DOCUMENTS

| | | | |
|---|---|---|---|
| 9,315,320 B2* | 4/2016 | Kawano | B65G 1/0407 |
| 2014/0031972 A1 | 1/2014 | DeWitt et al. | |
| 2015/0068875 A1 | 3/2015 | Berghorn et al. | |
| 2015/0071743 A1 | 3/2015 | Lert, Jr. | |
| 2015/0225187 A1 | 8/2015 | Razumov | |
| 2016/0129592 A1 | 5/2016 | Saboo et al. | |
| 2017/0158430 A1* | 6/2017 | Raizer | B65G 1/137 |
| 2018/0148259 A1* | 5/2018 | Gravelle | B65G 1/0464 |
| 2018/0305122 A1 | 10/2018 | Moulin et al. | |

FOREIGN PATENT DOCUMENTS

| | | |
|---|---|---|
| WO | 2010118412 A1 | 10/2010 |
| WO | 2013155107 A1 | 10/2013 |

OTHER PUBLICATIONS

Non-final Office Action issued for corresponding family U.S. Appl. No. 15/310,799, dated Nov. 23, 2018.

Final Office Action issued for corresponding family U.S. Appl. No. 15/310,799, dated Apr. 11, 2019.

Notice of Refusal issued for corresponding Japanese Patent Application No. 2017-561951, dated Jul. 22, 2020, with English translation attached.

* cited by examiner

ROBOTIC INVENTORY HANDLING

CROSS-REFERENCE TO RELATED APPLICATION

This application is a divisional of U.S. patent application Ser. No. 15/310,799, filed Nov. 14, 2016, which is a U.S. National Stage Application under Section 371 of International Patent Application No. PCT/IB2016/053354, filed Jun. 9, 2015, which claims the benefit of U.S. Provisional Patent Application 62/173,130, filed Jun. 9, 2015, the entire contents of each of which is incorporated herein by reference.

FIELD OF THE INVENTION

The present invention relates generally to automation, and particularly to systems, methods, and robotic devices for automated inventory handling.

BACKGROUND

The distribution center (DC) is one of the key links in the on-line retail supply chain, and also one of the key bottlenecks. DCs generally warehouse a large inventory of products, such as grocery items, of differing types, sizes, packaging and other physical characteristics. In response to customer orders, personnel in the DC pick and pack the required inventory items into deliverable packages for shipment to the customers.

A number of systems have been developed for automatically moving inventory items to and from shelves in a warehouse. For example, U.S. Patent Application Publication 2015/0071743 describes methods and apparatus for selecting and combining items in an outbound container through the use of autonomous vehicles, each of which includes means for automatically loading and unloading a payload. The vehicles perform both transfer and transport functions in moving containers of items within a workspace via a network of roadways. Under computer control, the autonomous vehicles transfer and transport case containers of item units between incoming receiving stations, intermediate storage locations, and outgoing order-assembly stations where entire containers or individual item units are combined in the outbound container.

As another example, U.S. Patent Application Publication 2015/0068875 describes a material-handling system and method in which a linear transfer system is made up of a plurality of transfer units that travel in unison in a linear motion past the input and output of a first processing station. The transfer units either receive articles from the output and discharge articles to the input or transfer articles between the first processing station and a second processing station. A control sequences articles between the transfer units and the first input and output or between the first processing station and a second processing station in a manner that enhances operation of the processing station.

SUMMARY

Embodiments of the present invention that are described hereinbelow provide improved systems, methods, and robotic devices for automated inventory handling.

There is therefore provided, in accordance with an embodiment of the invention, an inventory handling system, including multiple shelving units for mounting over a horizontal floor, each shelving unit containing a vertical array of shelves on which containers are placed. One or more floor robots are configured to travel among the shelving units along first paths on the floor. One or more lift robots are configured to move independently of the floor robots along second paths in a vertical plane over vertical faces of the shelving units, and to transfer the containers between the shelves and the floor robots.

In a disclosed embodiment, the floor robots are configured to convey the containers from the shelving units to a packing station and to deliver the containers to the lift robots for placement on the shelves. Additionally or alternatively the shelving units are elevated above the floor, and the floor robots are configured to receive the containers from the lift robots in locations in aisles alongside the shelving units and to travel beneath the shelves in order to deliver the containers to a destination.

In some embodiments, the multiple shelving units are arranged over the floor side by side, with a predefined gap between the vertical faces of adjacent shelving units, and the lift robots are configured to move along the second paths within the gap. Typically, the lift robots are configured, while moving within the gap, to engage the shelving units on both sides of the gap. Additionally or alternatively, the lift robots are configured to move independently of one another, so that two or more of the lift robots can simultaneously move along respective second paths with the same gap between adjacent shelving units. In one embodiment, the lift robots are configured to disengage autonomously from the vertical faces of the shelving units onto the floor robots, and the floor robots are configured to transport a lift robot from one gap to another gap among the shelving units, whereupon the lift robot reengages with the vertical faces of the shelving units in the other gap.

In the disclosed embodiments, the lift robots have first and second modes of travel, along vertical and horizontal directions, respectively, in the vertical plane, and the second paths consist of vertical and horizontal path segments traversed by the lift robots in the first and second modes of travel, respectively.

In some embodiments, the shelves have horizontal front edges in the vertical plane, and the shelving units include vertical struts extending between the horizontal front edges of the shelves, and the lift robots engage the vertical struts when traversing the vertical path segments and engage the horizontal front edges of the shelves when traversing the horizontal path segments. In one embodiment, the shelving units include vertical toothed racks arranged along the vertical struts, and the lift robots include pinions configured to engage the toothed racks so as to propel the lift robots along at least the vertical path segments. In another embodiment, the lift robots include wheels configured to roll against the vertical struts and the horizontal front edges, and the system includes winches, which include cables connected to the lift robots and which are configured to raise and lower the lift robots along the vertical path segments.

In still another embodiment, the shelving units include arrays of protrusions, which extend outward from the vertical faces, and the lift robots include a chain guide and a chain fitted over the chain guide and configured to engage the protrusions while rotating around the chain guide so as to propel the lift robots along at least the vertical path segments.

There is also provided, in accordance with an embodiment of the invention, inventory handling apparatus, including first and second frameworks of vertical and horizontal toothed racks, which are configured to be deployed on respective vertical faces of first and second shelving units, which contain vertical arrays of shelves and are arranged side by side with a predefined gap between the respective vertical faces. A lift robot is configured to travel along vertical and horizontal paths within the gap and includes a frame configured to transport items to and from the shelves, and first and second sets of pinions, which are configured to engage the toothed racks in the first and second frameworks, respectively. At least one motor is configured to drive the pinions so as to propel the frame along the vertical and horizontal paths.

In the disclosed embodiments, the frame includes at least one puller arm, which is configured to extend through the frameworks and to draw the items from the shelves into the frame for transport.

In a disclosed embodiment, the horizontal toothed racks are fixed to respective front edges of the shelves, while the vertical toothed racks are fixed to vertical struts extending between the shelves. Additionally or alternatively, each of the first and second sets of pinions includes at least first and second pinions, which are attached respectively to opposing sides of the frame and are configured to rotate along respective first and second parallel segments of the vertical and horizontal toothed racks.

Further additionally or alternatively, each of the first and second sets of pinions includes at least one pair of first and second pinions, which are rotatable between a vertical configuration in which the first pinion is positioned vertically above the second pinion for travel along the vertical toothed racks and a horizontal configuration in which the first and second pinions are positioned horizontally side by side for travel along the horizontal toothed racks. In some embodiments, the first and second pinions include respective first and second shafts, wherein each of the first and second sets of pinions includes a joint, which is connected to the shafts and is configured to rotate the shafts between the vertical and horizontal configurations. In a disclosed embodiment, the joint includes a brake, which is configured to lock the shafts in each of the vertical and horizontal configurations, respectively, during the travel along the vertical and horizontal toothed racks, and to release the shafts for rotation between the vertical and horizontal configurations at points of transition between the vertical and horizontal paths.

Additionally or alternatively, the frameworks include curved transition rack segments at corners in the framework where the vertical and horizontal toothed racks intersect, and the first and second pinions are configured to rotate about the joint at the corners so as to engage the curved transition rack segments at points of transition between the vertical and horizontal paths.

There is additionally provided, in accordance with an embodiment of the invention, inventory handling apparatus, including first and second arrays of protrusions, arranged in a predefined pattern over respective vertical faces of first and second shelving units, which contain vertical arrays of shelves and are arranged side by side with a predefined gap between the respective vertical faces. A lift robot is configured to travel along vertical and horizontal paths within the gap and includes a frame configured to transport items to and from the shelves. First and second chain drives are respectively disposed on opposing first and second sides of the frame, and include chain guides and chains, which are fitted over the chain guides and are configured to engage the protrusions in the first and second arrays, respectively, while rotating around the chain guides. At least one motor is configured to drive the chains to rotate around the chain guides so as to propel the frame along the vertical and horizontal paths.

In a disclosed embodiment, the protrusions include cylindrical pins. Additionally or alternatively, the protrusions protrude from front edges of the shelves and from vertical struts extending between the shelves. Further additionally or alternatively, each of the first and second chain drives includes first and second chain guides, and first and second chains, which are fitted respectively over the first and second chain guides and are configured to engage the protrusions along respective parallel segments of the arrays of protrusions on the respective vertical face of the first or second shelving unit.

In some embodiments, the predefined pattern of the protrusions includes a vertical columns and horizontal rows of the protrusions, and the chain guides are rotatable between a vertical configuration, in which the chains engage the protrusions in the vertical columns so as to propel the frame along the vertical paths, and a horizontal configuration, in which the chains engage the protrusions in the horizontal rows so as to propel the frame along the horizontal paths. In a disclosed embodiment, the chain guides have an oblong shape, and a major axis of the oblong shape is oriented vertically in the vertical configuration and horizontally in the horizontal configuration. Additionally or alternatively, each of the chain drives includes an actuator, which is coupled to rotate each chain guide about a respective axis between vertical and horizontal orientations of the chain guide, and a lock, which is configured to hold the chain guide in the vertical orientation during travel of the lift robot along the vertical paths and to release the chain guide to rotate to the horizontal orientation for travel along the horizontal paths.

There is further provided, in accordance with an embodiment of the invention, inventory handling apparatus, including first and second frameworks of vertical and horizontal rails, which are configured to be deployed on respective vertical faces of first and second shelving units, which contain vertical arrays of shelves and are arranged side by side with a predefined gap between the respective vertical faces. A lift robot is configured to travel along vertical and horizontal paths within the gap and includes a frame configured to transport items to and from the shelves, and wheels, which are respectively connected to opposing sides of the frame and are configured to engage the vertical and horizontal rails on the respective vertical faces of the first and second shelving units during travel of the lift robot along the vertical and horizontal paths, respectively. At least one motor is configured to drive the wheels so as to propel the frame along the horizontal paths. A winch includes a cable connected to the frame and is configured to raise and lower the frame along the vertical paths.

In a disclosed embodiment, the horizontal rails extend from respective front edges of the shelves, while the vertical rails extend from vertical struts extending between the shelves. Additionally or alternatively, the winch is suspended above the gap and is configured to travel along a length of the gap as the lift robot travels along the horizontal paths.

In some embodiments, the wheels include vertical wheels, which are configured to engage the vertical rails, and horizontal wheels, which are configured to engage the horizontal rails, wherein the at least one motor is configured to drive the horizontal wheels. In a disclosed embodiment, the apparatus includes at least one actuator, which is configured to disengage the vertical wheels from the vertical rail during travel of the lift robot along the horizontal paths, and to disengage the horizontal wheels from the horizontal rail during travel of the lift robot along the vertical paths.

There is moreover provided, in accordance with an embodiment of the invention, a method for inventory handling, which includes placing containers on shelves in multiple shelving units, which are mounted over a horizontal floor, each shelving unit containing a vertical array of the shelves. Upon designating a container to be transferred from a current location on one of the shelves in one of the shelving units to a specified destination, floor robot is operated to travel among the shelving units along a first path to a rendezvous point. A lift robot is operated to move, independently of the floor robot, along a second path in a vertical plane over a vertical face of the one of the shelving units to the current location of the designated container, and to transfer the designated container from the current location to the floor robot at the rendezvous point. The designated container is then transported, using the floor robot, to the specified destination.

In a disclosed embodiment, the method includes conveying the designated container on the floor robot from the rendezvous point to a packing station. Additionally or alternatively, placing the containers on the shelves includes delivering the containers from the floor robot to the lift robot for placement on the shelves.

Further additionally or alternatively, operating the lift robot includes actuating at least one puller arm on the lift robot to extend through the vertical face of the one of the shelving units and to draw the designated container from the current location into the lift robot for transport.

The present invention will be more fully understood from the following detailed description of the embodiments thereof, taken together with the drawings in which:

DETAILED DESCRIPTION OF EMBODIMENTS

Overview

Figure 1:
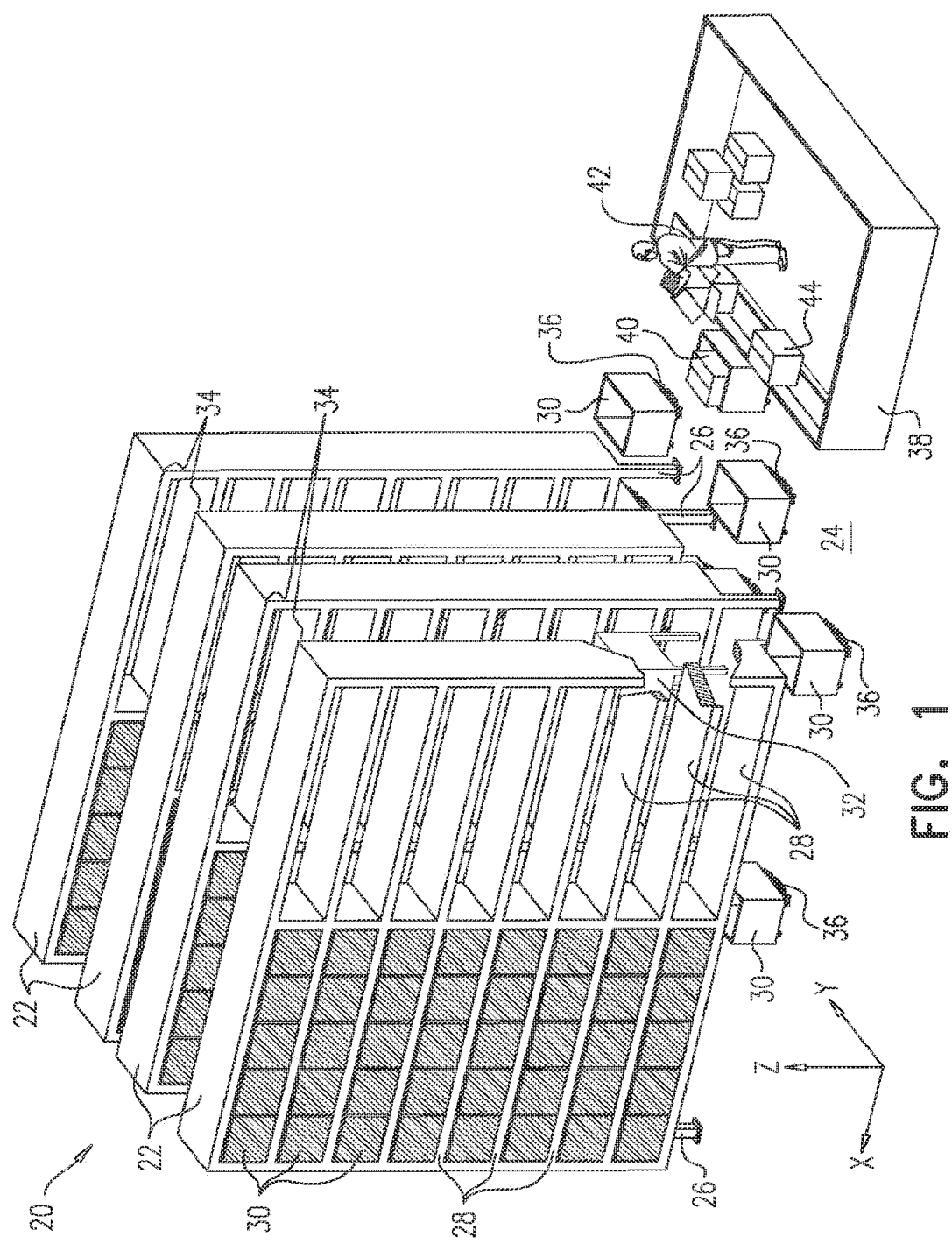
FIG. 1 is a schematic pictorial illustration of an automated distribution center, in accordance with an embodiment of the invention.

Embodiments of the present invention that are described herein provide robotic solutions for inventory handling that enable large volumes of diverse items to be stored with high density and transported into and out of a compact facility with high throughput. These solutions are particularly effective in retail distribution centers, for picking and packing of grocery items in response to customer orders, for example. They enable such facilities to be made sufficiently compact to be deployed locally, and possibly attached to existing "brick and mortar" retail establishments. The principles of the present invention are not limited to this particular application environment, however, and may similarly be applied in addressing other inventory-handling needs.

In the disclosed embodiments, an inventory handling system comprises multiple shelving units for mounting over a horizontal floor, either mounted on the floor itself or suspended above it. Each shelving unit contains a vertical array of shelves on which containers are placed. Floor robots travel among the shelving units along paths on the floor. Separately and independently of the floor robots, lift robots move along horizontal and vertical paths in vertical planes over the vertical faces of the shelving units. The lift robots remove and transfer containers from the shelves to the floor robots, and vice versa, while the floor robots convey the containers from the shelving units to a packing station and deliver containers to the floor robots for placement on the shelves.

The independent but coordinated movement paths of the two types of robots—lift robots on the faces of the shelving units and floor robots below—enable rapid and efficient movement of many inventory items in a confined space. These capabilities are further enhanced, in some embodiments, by elevating the shelving units above the floor, for example on legs high enough so that a floor robot loaded with a container can travel beneath the shelves. Thus, the floor robots receive the containers from the lift robots in locations in the aisles alongside the shelving units, and then travel beneath the shelves in order to deliver the containers to their destination. This arrangement allows flexible route planning and efficient transport by the floor robots, by eliminating bottlenecks that could otherwise occur in the aisles between the shelving units.

In some embodiments, the multiple shelving units are arranged over the floor side by side, with a predefined gap between the vertical faces of adjacent shelving units. The lift robots move along their paths in vertical planes within these gaps, while engaging the shelving units on both sides of the gap. This approach enables secure, efficient motion of the lift robots along the vertical and horizontal paths among the shelves. In some of these embodiments, the lift robots move independently of one another, so that two or more lift robots can simultaneously move along different, respective paths with the same gap between adjacent shelving units.

In one embodiment, the lift robots are able to disengage autonomously from the vertical faces of the shelving units onto a floor robot waiting below. The floor robot can thus transport the lift robot from one gap to another gap among the shelving units. The lift robot then reengages with the vertical faces of the shelving units in the other gap.

In the disclosed embodiments, the lift robots have two different modes of travel, along vertical and horizontal paths, respectively, in the vertical plane. To move from one location to another along the vertical face of a given shelving unit (or, in particular, in the gap between the faces of two adjacent shelving units), the lift robots alternate between the two modes of travel and thus traverse paths consisting of vertical and horizontal path segments. A number of different types of lift robots implementing these principles are described hereinbelow.

Typically, the vertical face of each shelving unit is defined by the horizontal front edges of the shelves and by vertical struts extending between these horizontal front edges. In some embodiments, the lift robots engage these vertical struts when traversing the vertical path segments and engage the horizontal front edges of the shelves when traversing the horizontal path segments. In one embodiment, toothed racks are arranged along the vertical struts, and possibly along the horizontal front edges of the shelves, as well; and the lift robot comprises pinions that engage these toothed racks in order to propel the lift robot along the corresponding path segments. In another embodiment, the lift robot comprises wheels that roll against the vertical struts and the horizontal front edges, while a winch, with a cable connected to the lift robot, raises and lowers the lift robot along the vertical path segments. In an alternative embodiment, the lift robot comprises caterpillar treads, which engage the vertical struts and horizontal front edges of the shelves by frictional contact.

In yet another embodiment, the shelving units comprise arrays of protrusions, such as cylindrical pins, which extend outward from the vertical faces. The lift robot in this case comprises a chain guide and a chain, which is fitted over the chain guide and engages the protrusions. The chain is driven to rotate around the chain guide so as to propel the lift robot along the vertical and horizontal path segments. Alternatively, the shelving units may comprise arrays of holes or indentation, while the lift robot has toothed wheels that rotate while engaging the holes.

Although certain particular configurations of the robots and compatible shelving units are shown and described herein, the principles of the present invention may similarly be implemented using other shelving and robot designs. All such alternative designs are considered to be within the scope of the present invention.

System Description

FIG. 1 is a schematic pictorial illustration of an automated distribution center 20, in accordance with an embodiment of the invention. Center 20 comprises multiple shelving units 22, which are mounted side-by-side over a horizontal floor 24. In the pictured embodiments, shelving units 22 are mounted on the floor by legs 26, but alternatively, the shelving units may be suspended from the ceiling or otherwise held above the floors by any suitable means that are known in the art. For clarity and convenience in the description that follows, the horizontal plane of floor 24 is taken to be the X-Y plane, with the X-axis running along the length of shelving units 22. The vertical faces of shelving units 22 are thus taken to be X-Z planes, as marked in FIG. 1.

Each shelving unit 22 contains a vertical array of shelves 28 on which containers 30 are placed. (Containers of this sort are also commonly referred to as "totes.") It is advantageous, although not mandatory, that containers 30 be of identical sizes and shapes. Each container holds a certain type of inventory item or possibly a number of different types of inventory item. A central server (not shown) tracks the contents of containers 30 and their respective location in order to plan and direct the operations of the robots and personnel in distribution center 20, hut these operational aspects are beyond the scope of the present description.

Lift robots 32 move along vertical and horizontal paths in planes that are defined by the vertical faces of shelving units 22. Upon reaching the location of a given container 30, lift robot 32 removes and transports the container away from its shelf 28, and in similar fashion returns containers to empty locations on the shelves. Although only a single, simplified lift robot 32 is shown in FIG. 1, in practice multiple lift robots are typically deployed among shelving units 22 and move independently of one another in respective gaps 34 between adjacent shelving units 22. In some embodiments, for enhanced throughput, two or more lift robots may operate and travel autonomously along separate paths within the same gap.

In the disclosed embodiments, lift robots 32 move along their paths within gaps 34 while engaging the vertical faces of one or both of the shelving units 22 adjacent to the gap. The lift robots are thus able to access containers in the two shelving units 22 on both opposing sides of the gap. The gaps have a predefined, well-controlled width, which enables lift robots to move while engaging the vertical faces of the shelving units on both sides of the gap, as explained in greater detail hereinbelow. Pairs of shelving units 22 may be arranged back-to-back, as shown in FIG. 1, since lift robots 32 need to access shelves 28 from only one side of each shelving unit (i.e., the side facing into the adjacent gap). Alternatively, the shelving units may be deep enough to hold two containers end-to-end in the Y-direction, with gaps 34 on both sides of the shelving unit.

In an alternative embodiment, not shown in the figures, lift robots 32 move over a single vertical face of shelving units 22, without necessarily engaging another, opposing shelving unit. This sort of situation may arise, for example, when a shelving unit faces a wall, in which case the lift robot moves within the gap between the shelving unit and the wall. In such cases, a special framework may be mounted on the wall and engaged by the lift robot, in addition to engaging the vertical face of the shelving unit. Alternatively, the lift robot may be configured to engage only the vertical face of a single shelving unit, without engaging any sort of framework or support on the opposite side of the lift robot.

Floor robots 36 travel among shelving units 22 along horizontal paths on floor 24, moving independently of but in coordination with lift robots 32. Lift robots 32 transfer containers 30 that they have removed from shelves 28 to floor robots 36, which then convey the containers from shelving units 22 to a specified destination. In the pictured embodiments, legs 26 of shelving units 22 are high enough so that floor robots 36 can travel beneath shelves 28 in order to deliver containers 30 to their destinations. In distribution center 20, for example, floor robots convey containers 30 to a packing station 38, where a picker 42 moves items 40 from the containers to cartons 44 for delivery to customers. Similarly, floor robots 36 convey containers 30 to lift robots 32 for placement on shelves 28.

In an alternative embodiment (not shown in the figures), shelving units 22 extend vertically over multiple floors of a storage facility. Vertical rails, connected to the shelving units, extend through openings in the floors and thus enable lift robots to travel along the rails between shelving units on different floors.

Figure 2:
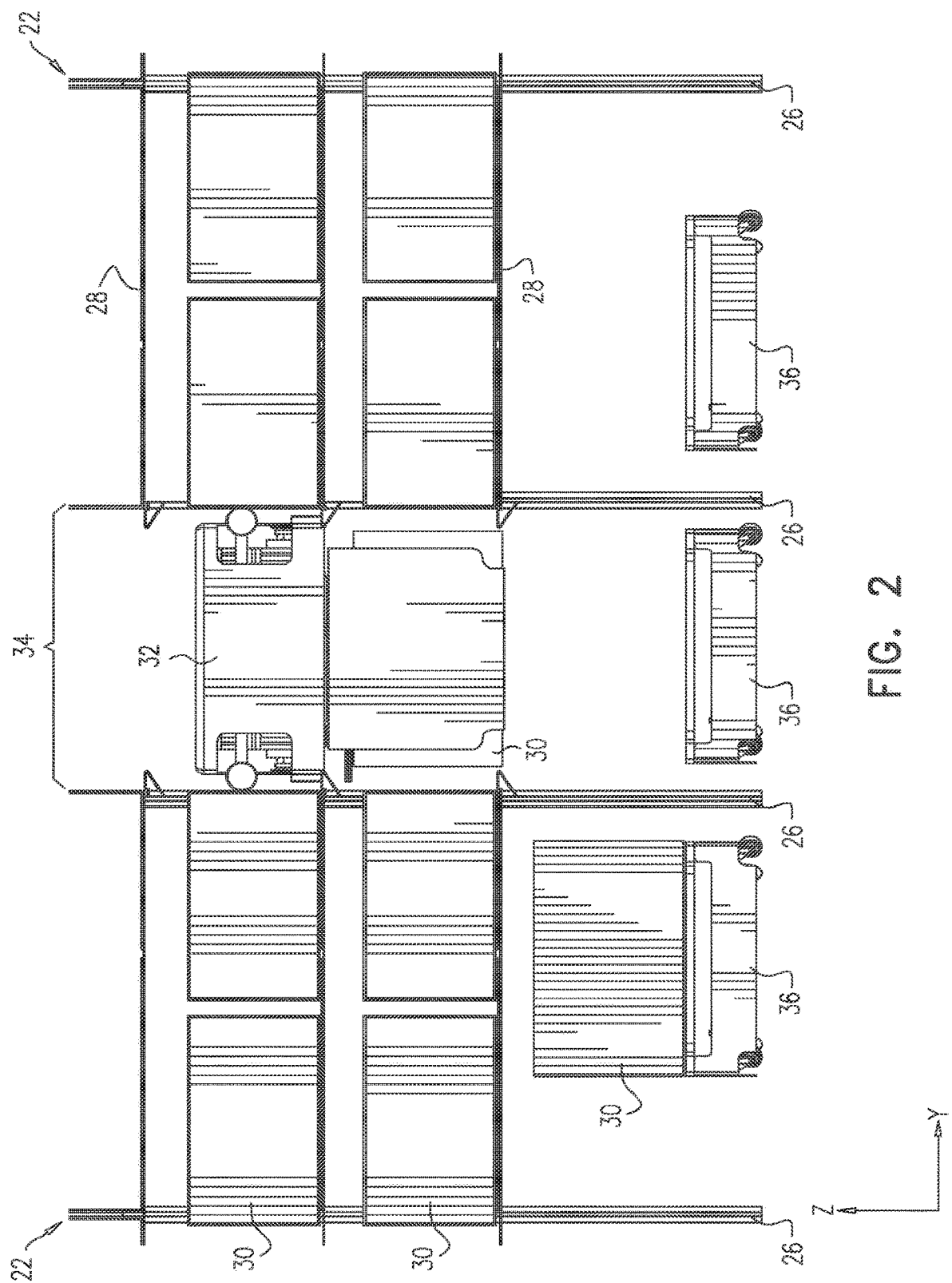
FIG. 2 is a schematic side view of robots and shelving units in an automated distribution center, in accordance with an embodiment of the invention.

FIG. 2 is a schematic side view showing details of robots 32, 36 and shelving units 22 in distribution center 20, in accordance with an embodiment of the invention. As noted earlier, floor robots 36 receive containers 30 from and transfer containers to lift robots 32 in locations alongside shelving units 22, within gaps 34. The floor robots travel beneath shelves 28 in order to deliver the containers to their destinations, as well as to reach their rendezvous points with the lift robots. Thus, for example, in some implementations, gap 34 serves mainly as a loading zone for floor robots 36, while the areas beneath shelves 28 serve as entry and exit lanes. Optionally, one or more of the floor robots may be equipped with a sort of scaffolding (not shown in the figures) that enables the lift robots themselves to descend onto and be transported by these floor robots.

Figure 3:
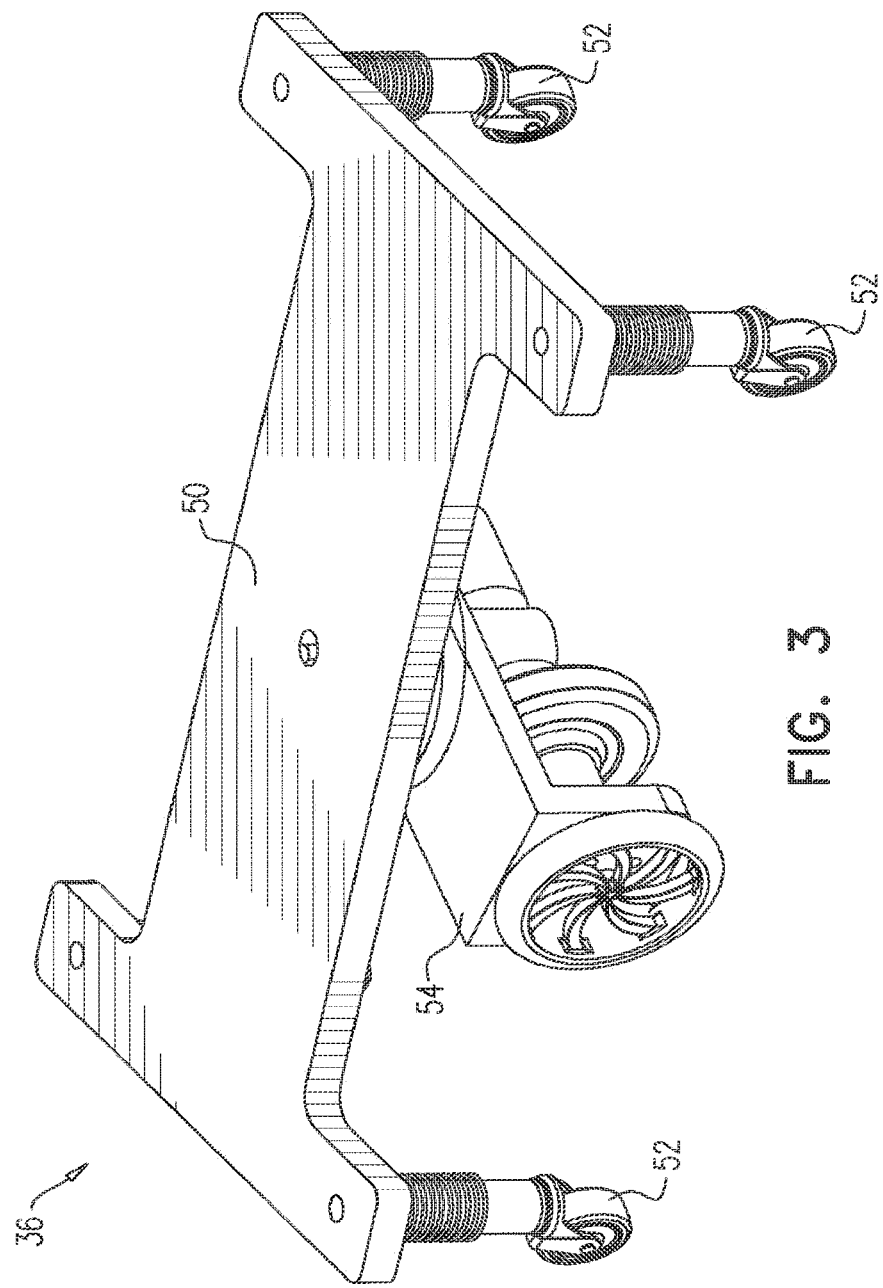
FIG. 3 is a schematic pictorial illustration of a robot for transport of containers over a horizontal surface, in accordance with an embodiment of the invention.

FIG. 3 is a schematic pictorial illustration showing details of floor robot 36, in accordance with an embodiment of the invention. Floor robot 36 comprises a carrier platform 50, suitable for carrying containers 30 and mounted on wheels 52. A drive unit 54 steers and propels floor robot 36 to its destination under wireless control, as is known in the art.

Figure 4:
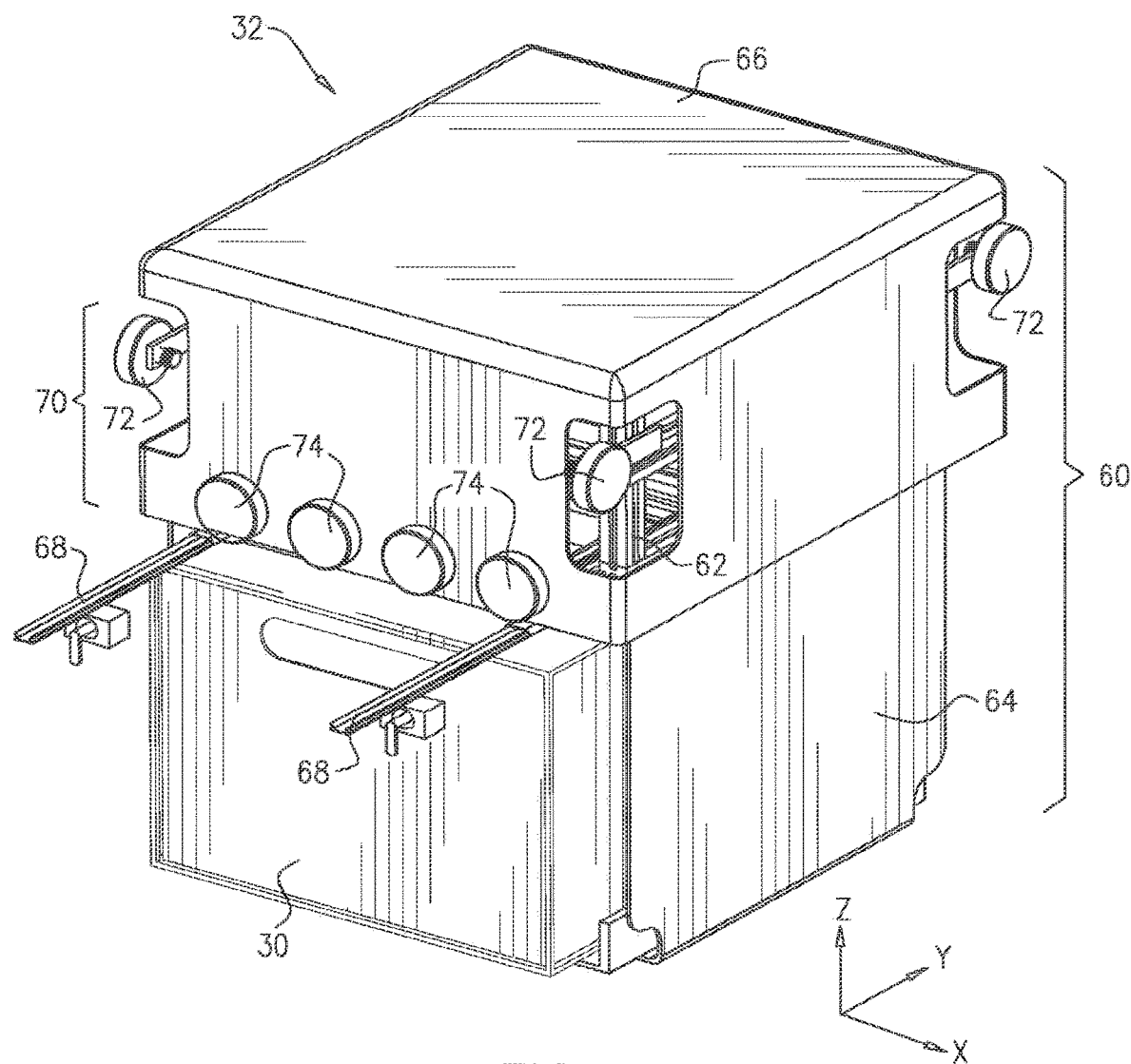
FIG. 4 is a schematic pictorial illustration of a robot for transport of containers along paths in a vertical plane, in accordance with an embodiment of the invention.

FIG. 4 is a schematic pictorial illustration showing details of lift robot 32, in accordance with an embodiment of the invention. Lift robot 32 comprises a frame 60, which includes a chassis 62 and a container holder 64, which is of appropriate shape and size to receive and transport containers 30. (Most of chassis 62, along with the motors and actuators that drive robot 32, is enclosed in a case 66.) One or more puller arms 68 are able to extend through the framework of shelves 28 and vertical struts at the vertical face of shelving unit 22 in order to draw containers 30 from shelves 28 into holder 64 for transport. Anus 68 may also be used to push containers out of holder 64 onto the shelves. Upon reaching a rendezvous with floor robot 36, holder 64 releases container 30 onto platform 50 of the floor robot. Holder 64 can similarly lift a container from platform 50 in order to deliver the container to a designated location on one of the shelves.

Lift robot 32 comprises a transport mechanism 70, which is attached to chassis 62 and is capable of vertical and horizontal modes of travel, along vertical and horizontal path segments in the X-Z plane. For this purpose, in the present embodiment, mechanism 70 comprises vertical wheels 72, which roll vertically against vertical struts between shelves 28 in shelving units 22, and horizontal wheels 74, which roll against the horizontal front edges of the shelves. At any given stage, only one of the sets of wheels (72 or 74) is engaged, depending on whether the current motion segment is vertical or horizontal, while the other set is disengaged, and possibly retracted out of the way.

A number of example lift robots with alternative transport mechanisms are shown in the figures that follow. These robots typically include holders 64 for containers 30 and puller arms 68 or other mechanisms for drawing containers into and pushing containers out of the holder; but some of these elements are omitted from the figures for the sake of simplicity and clarity of illustration.

Lift Robot with Pinion-Based Propulsion

Figure 5:
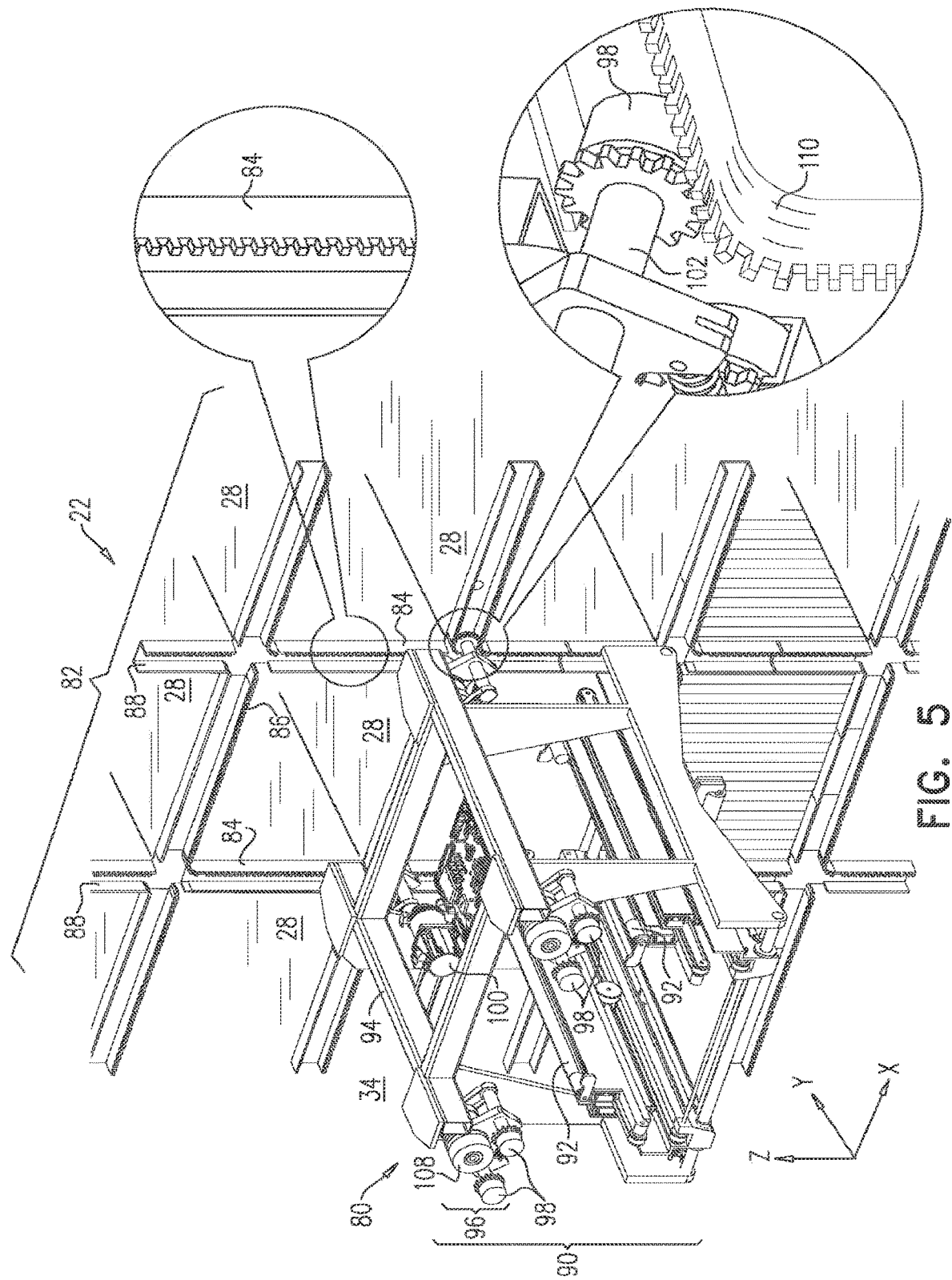
FIG. 5 is a schematic pictorial illustration showing details of a robot for transport of containers along paths in a vertical plane, in accordance with an embodiment of the invention.
Figure 6:
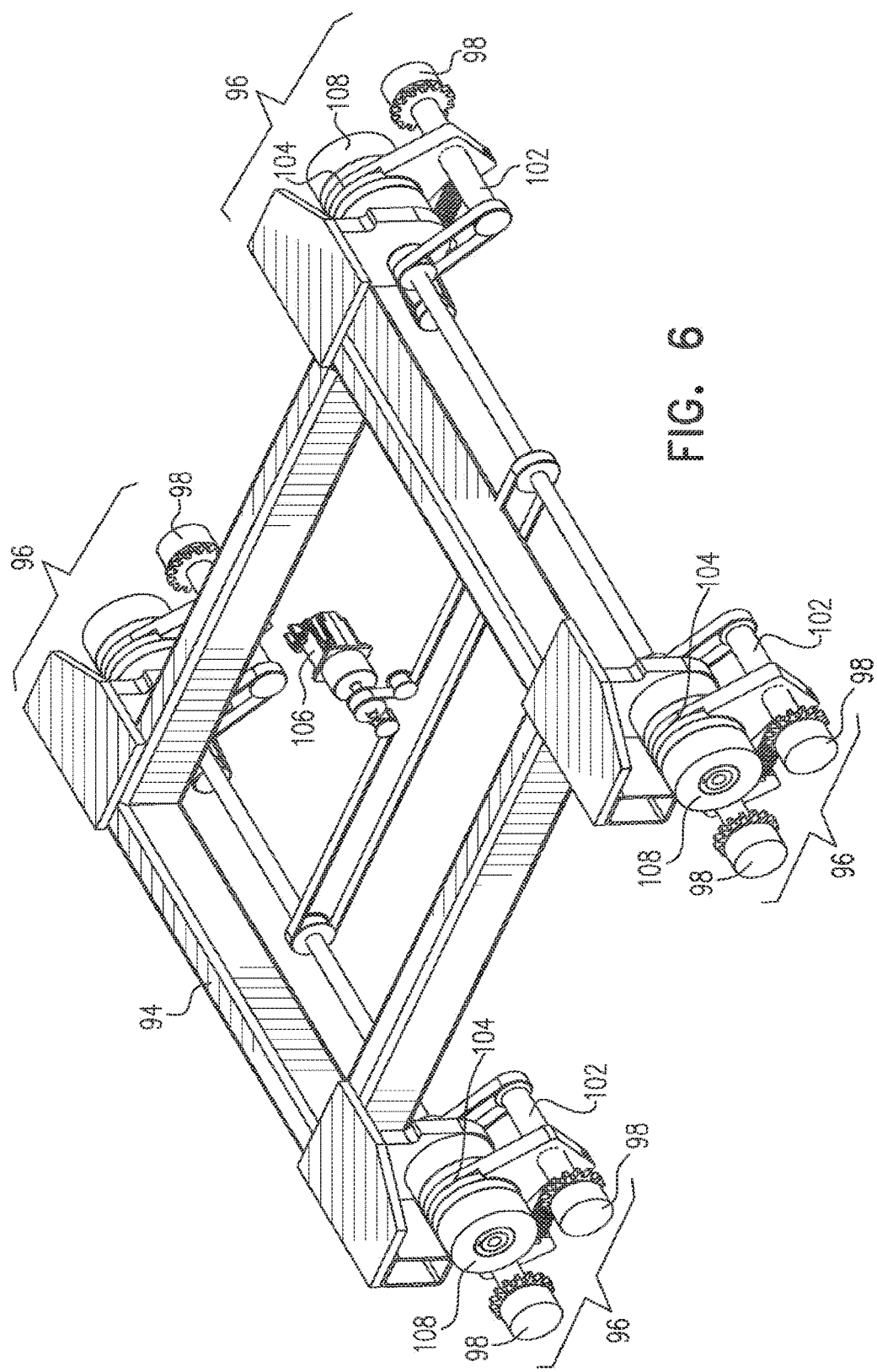
FIG. 6 is a schematic pictorial illustration showing further details of the robot of FIG. 5, in accordance with an embodiment of the invention.

Reference is now made to FIGS. 5 and 6, which are schematic pictorial illustrations of a lift robot 80 for transport of containers 30 along paths in a vertical plane, in accordance with an embodiment of the invention. FIG. 5 shows robot 80 traveling within gap 34 between the vertical faces of a pair of adjacent shelving units 22. Robot 80 engages both faces in an identical manner, although only one of the two shelving units is shown in the figure for the sake of clarity of illustration. FIG. 6 shows details of the transport mechanism of robot 80.

A framework 82 of vertical and horizontal toothed racks 84, 86 is deployed on the vertical face of shelving unit 22, with a similar framework on the shelving unit (or possibly on a wall or other support) on the opposing side of gap 34. Racks 86 are arranged along the horizontal front edges of shelves 28, while racks 84 are arranged along vertical struts 88 extending between the shelves. The racks may either be integrally fainted as part of the shelves and struts, or attached by suitable fasteners or welding, for example.

Robot 80 comprises a frame 90, which is sized to match framework 82 and comprises a holder (not shown) for transporting containers 30. A pair of puller arms 92 on frame 90 drawn containers 30 into the frame for transport, as explained above. Frame 90 also comprises a chassis 94, on which a transport mechanism is mounted, including four sets 96 of pinions 98. Pinions 98 engage respective toothed racks 84 or 86, depending upon whether robot 80 is in a vertical or horizontal mode of motion. A motor 100 (or possibly multiple motors) drives pinions 98 so as to propel frame 90 along the vertical and horizontal paths defined by racks 84 and 86. Two sets 96 of pinions 98 are mounted on each side of chassis 94 and are positioned so as to rotate along respective parallel segments of racks 84 and 86.

Each set 96 comprises a pair of pinions 98, which are rotatable between a vertical configuration in which one pinion is positioned vertically above the other and a horizontal configuration in which the two pinions are positioned horizontally side by side, as shown in FIG. 6. The vertical configuration is used for travel along vertical racks 84, while the horizontal configuration is for travel along horizontal racks 86. Pinions 98 rotate about respective shafts 102, and each set 96 of pinions 98 comprises a joint 104, which is connected to shafts 102 and can rotate the shafts between the vertical and horizontal configurations under control of an actuator 106.

A brake 108 on each of joints 104 locks shafts 102 in the vertical or horizontal configuration, depending upon whether pinions 98 are traveling along vertical racks 84 or horizontal racks 86. Brake 108 releases the shafts for rotation between the vertical and horizontal configurations at points of transition between vertical and horizontal path segments as robot 80 travels over racks 84 and 86. In the pictured embodiment, framework 82 comprises curved transition rack segments 110 at corners in framework 82 where the vertical and horizontal racks 84 and 86 intersect (as shown in the inset in FIG. 5). When robot 80 is to turn one of these corners, brakes 108 release joints 104 and thus allow pinions 98 to rotate about the joints and engage curved transition rack segments 110. After turning the corner, brake 108 locks pinions 98 in their new configuration.

Lift Robot with Chain Drive

Figure 7:
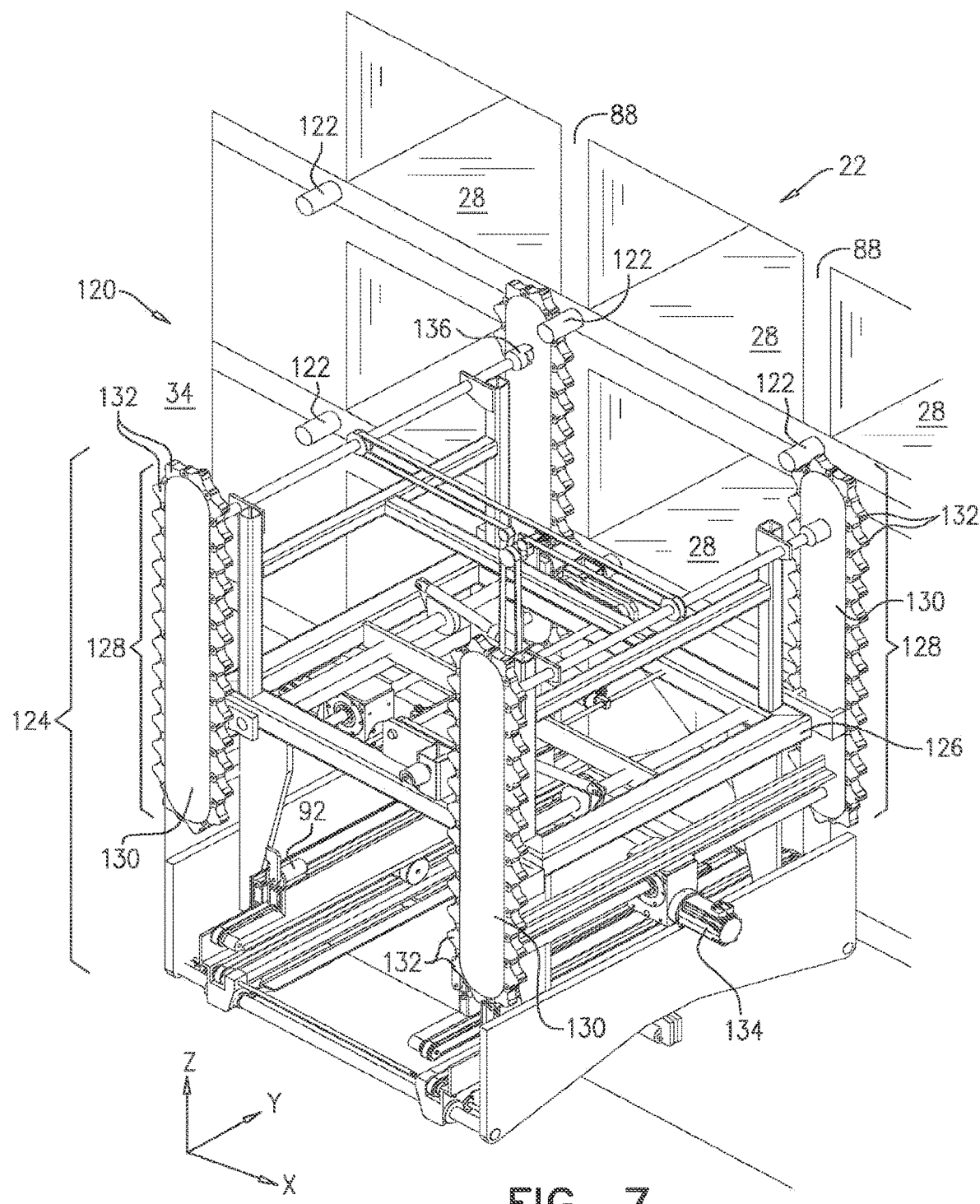
FIG. 7 is a schematic pictorial illustration showing details of a robot for transport of containers along paths in a vertical plane, in accordance with another embodiment of the invention.

FIG. 7 is a schematic pictorial illustration showing details of a lift robot 120 for transport of containers 30 along paths in a vertical plane, in accordance with another embodiment of the invention. As in the preceding embodiment, FIG. 7 shows robot 120 traveling within gap 34 between the vertical faces of a pair of adjacent shelving units 22, engaging both faces in an identical manner (although only one of the two shelving units is shown in the figure for the sake of simplicity and clarity of illustration). Alternatively, as in the preceding embodiments, robot 120 can also travel in the gap between a single shelving unit and a suitable framework mounted, for example, on the wall of a distribution center.

For the purpose of propulsion of robot 120, arrays of protrusions, such as cylindrical pins 122, are arranged in a predefined pattern over the vertical faces of shelving units 22. Typically (although not necessarily), pins 122 are arranged in a rectilinear pattern, protruding from the horizontal front edges of shelves 28 and vertical struts 88 between the shelves, for example at the corners where the struts intersect with the shelves as shown in FIG. 7. The pattern of pins 122 thus comprises intersecting vertical columns and horizontal rows of the pins. As explained below, robot 120 travels along vertical and horizontal paths defined by these columns and rows. Pins 122 may be integrally manufactured as a part of shelves 28 and struts 84, or they may alternatively be retrofitted to existing shelving units.

Robot 120 comprises a frame 124, which is sized to match the pattern of pins 122 and comprises a holder (not shown) for transporting containers 30. Frame 124 also comprises a chassis 126, on which a transport mechanism is mounted, based on pairs of chain drives 128 on both sides of frame 124. Each chain drive 128 comprises a chain guide 130, with a chain 132 fitted over the chain guide and configured to engage pins 122. One or more motors 134 drive chains 132 to rotate around respective chain guides 130 and thus propel frame 124 along the vertical and horizontal paths that are defined by the columns and rows of pins 122.

Figure 10:
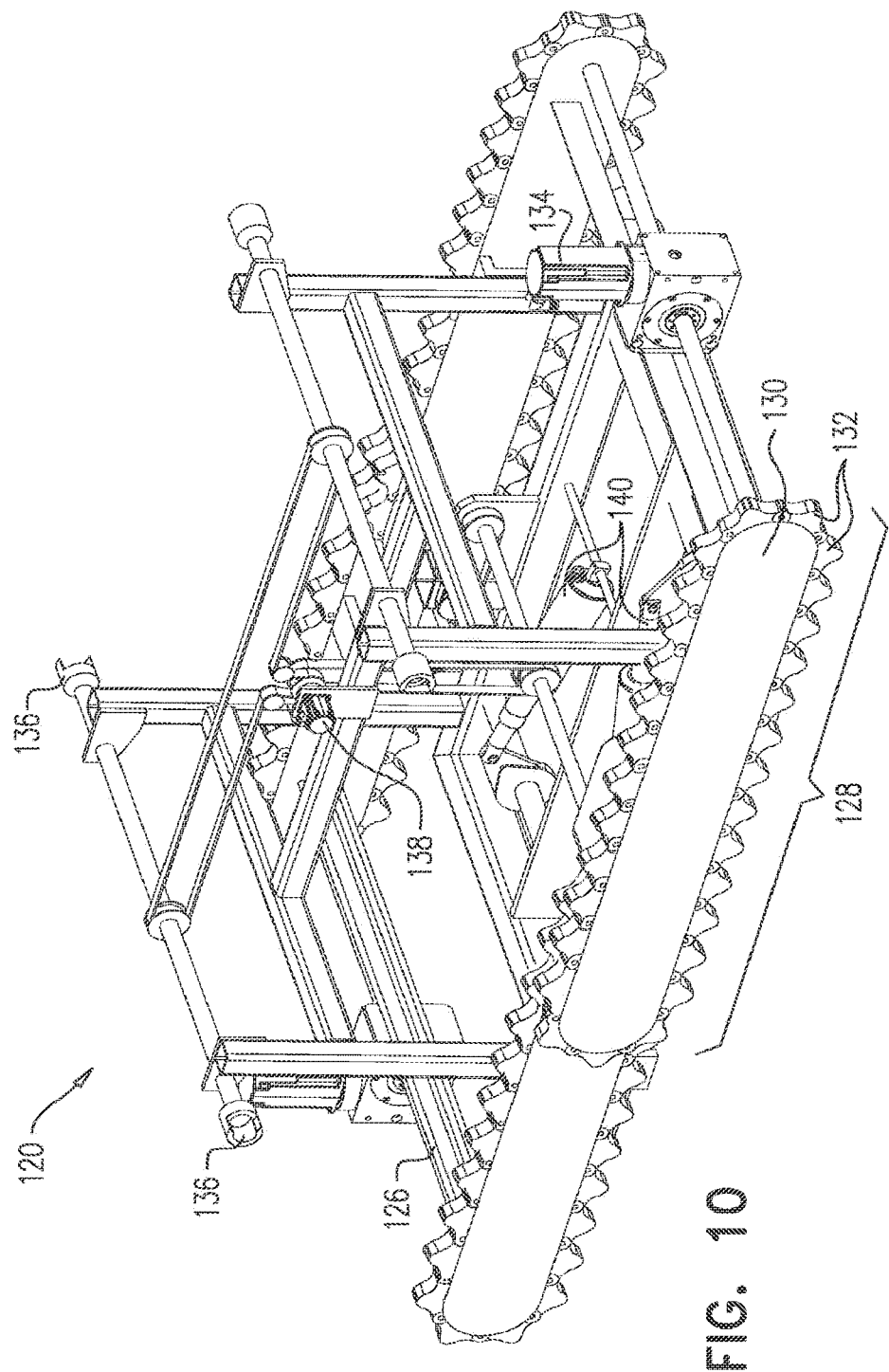

Chain guides 130 are rotatable between a vertical configuration, as shown in FIG. 7, and a horizontal configuration, shown in FIG. 10. In the vertical configuration, chains 132 engage pins 122 in the vertical columns so as to propel frame 124 along the vertical paths, while in the horizontal configuration, the chains engage the pins in the horizontal rows and thus propel the frame along the horizontal paths. In the pictured example, chain guides 130 have an oblong shape (such as an elongated rectangle with rounded ends in the present example), with the major axis of the oblong shape oriented vertically in the vertical configuration of FIG. 7 and horizontally in the horizontal configuration of FIG. 10.

In the vertical configuration, the two chain drives 128 on each side of frame 124 engage pins 122 along respective parallel segments of the array of pins on the vertical face of the shelving unit 22 on the corresponding side of gap 34. Thus, in the pictured example, robot 120 climbs up and down along adjoining pairs of vertical struts 88. The spacing between chain guides 130 matches the spacing of the struts and hence of the columns of pins 122. Alternatively, the principles of this embodiment may be implemented over other types of protrusions, which may be arranged as shown in FIG. 7 or in accordance with other patterns.

Figure 8:
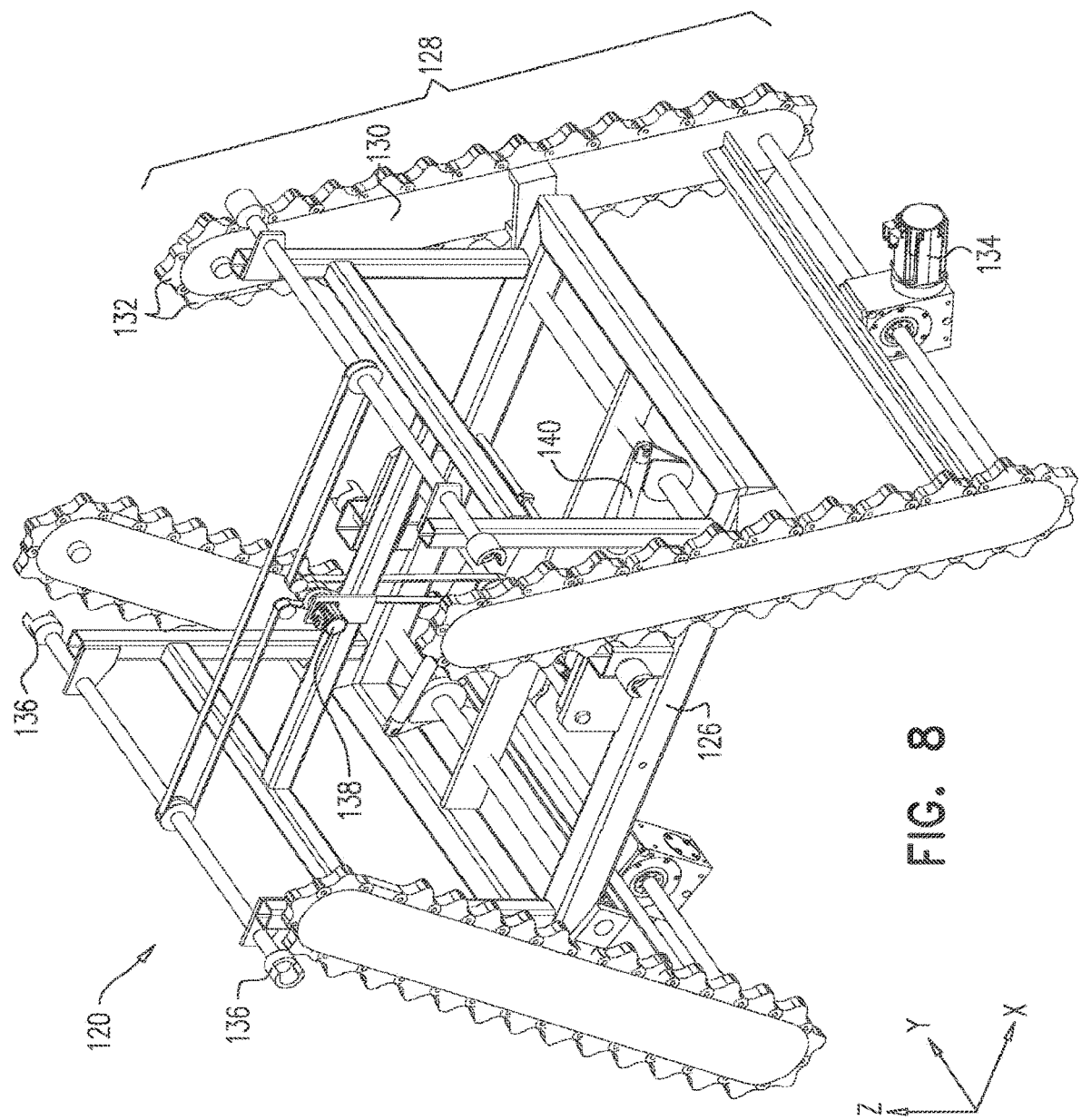
FIGS. 8-10 are schematic pictorial illustrations of the robot of FIG. 7, showing successive stages in a transition of the robot from a vertical travel configuration to a horizontal travel configuration, in accordance with an embodiment of the invention.
Figure 9:
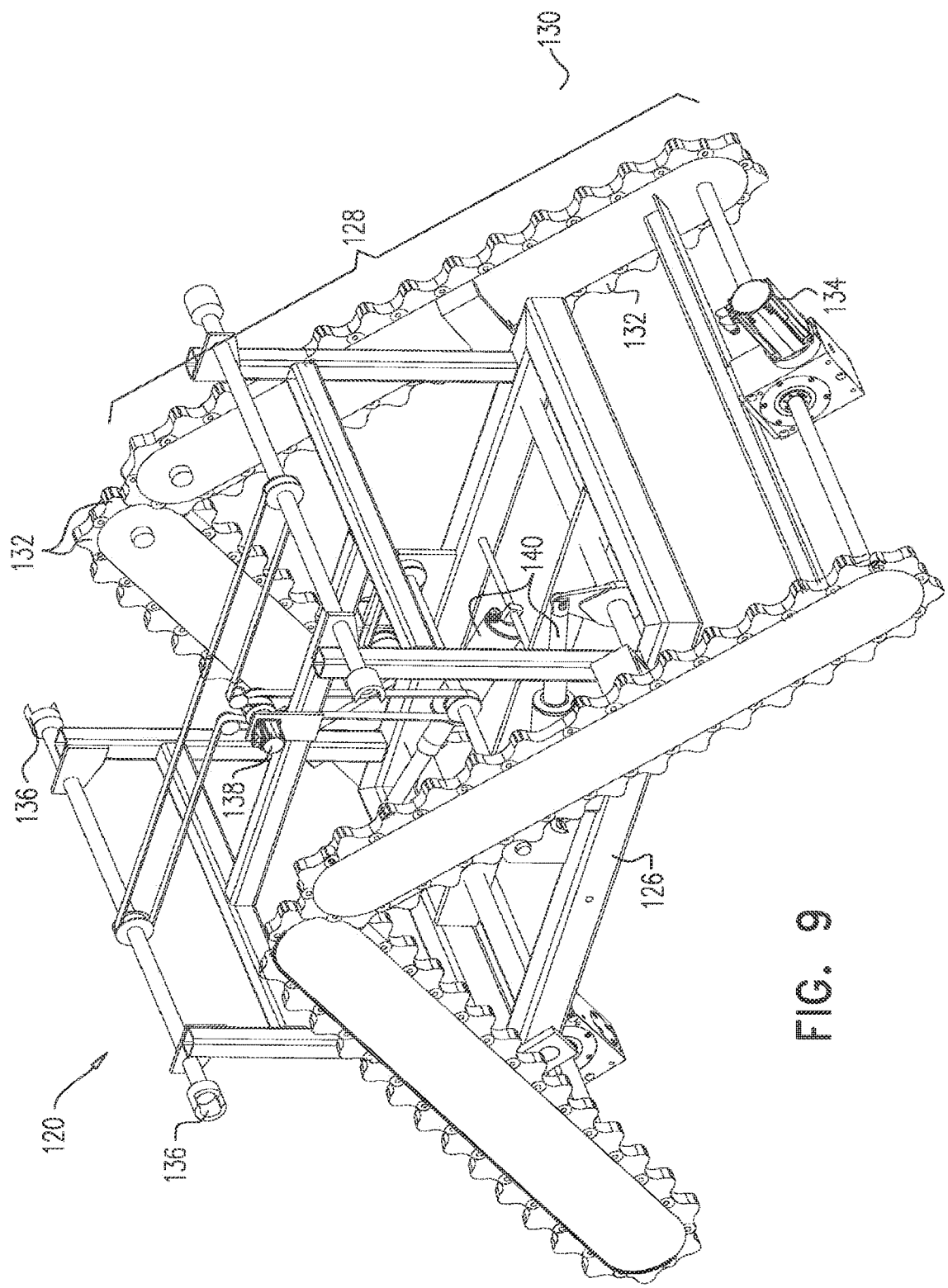

FIGS. 8-10 are schematic pictorial illustrations of robot 120, showing successive stages in a transition of the robot from the vertical travel configuration of FIG. 7 to the horizontal travel configuration shown in FIG. 10, in accordance with an embodiment of the invention. This transition typically takes place at corners in the array of pins 122, when robot 120 is to turn from a vertical path segment to a horizontal path segment. The reverse process takes place at transitions from horizontal to vertical path segments. In FIG. 8, chain drives 128 have been released from the vertical orientation shown in FIG. 7, and the major axes of chain guides 130 have thus begun to incline inward toward the horizontal. This process continues in FIG. 9 and is then completed in FIG. 10, with chain guides 130 oriented horizontally. In this latter configuration, rotation of chains 132 propels robot 120 along the rows of pins 122 on the opposing faces of shelving units 22.

To enable these modes of motion and safe transition between the modes, each of chain drives 128 comprises a lock 136, which holds chain guide 130 in the vertical orientation during travel of lift robot 120 along the vertical paths. A lock actuator 138 opens locks 136 and thus releases chain guides 130 to rotate gradually to the horizontal orientation. A rotation actuator 140 then rotates each chain guide 130 about a respective axis between the vertical and horizontal orientations, as shown in FIGS. 8-10. This transition between vertical and horizontal modes of travel takes place with robot 120 in a location where pins 122 are located at or near the centers of rotation of the chain guides.

Lift Robot with Winch Assistance

Figure 11:
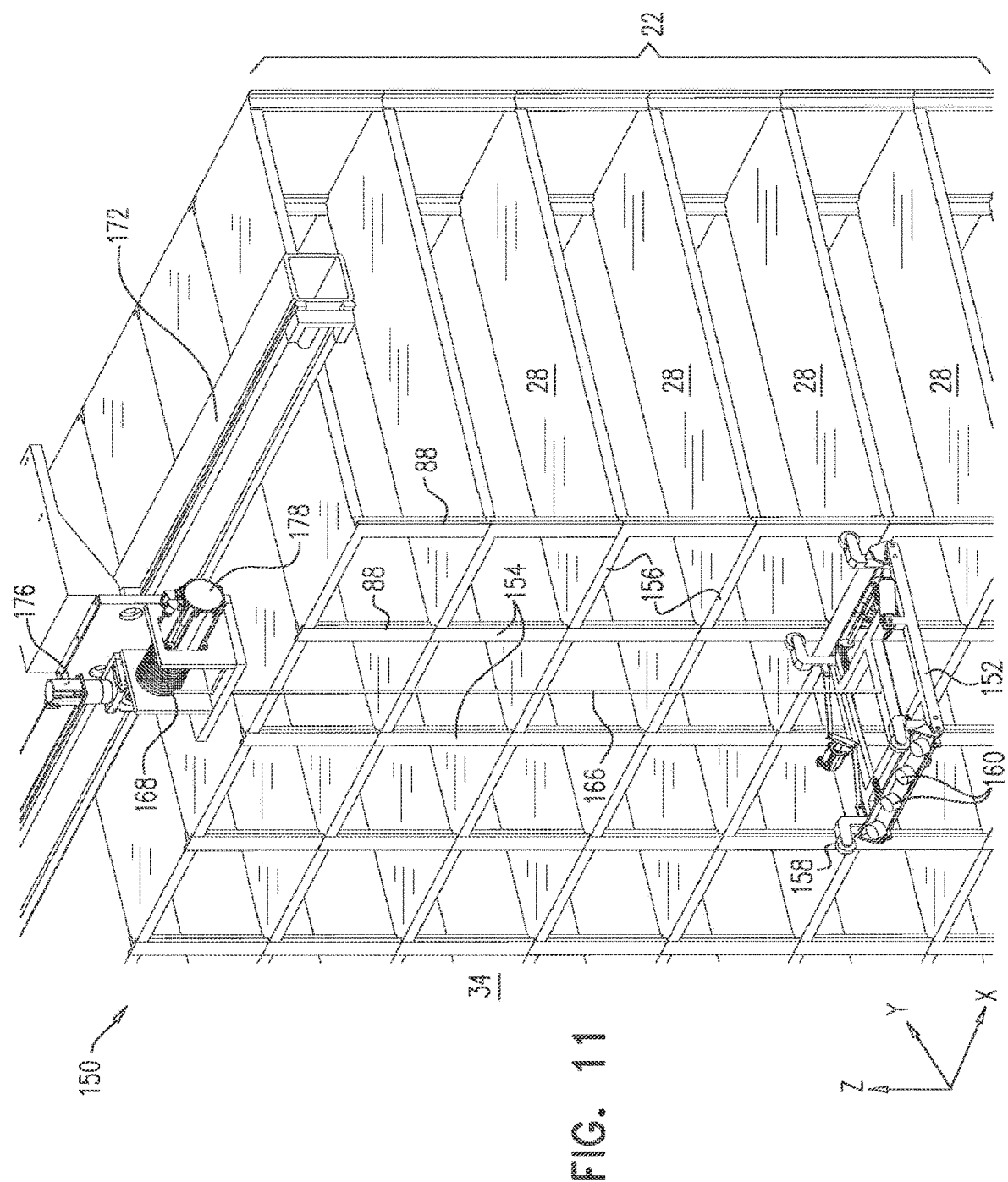
FIG. 11 is a schematic pictorial illustration of a shelving unit and a robot for transport of containers along paths over a vertical face of the shelving unit, in accordance with yet another embodiment of the invention.
Figure 12:
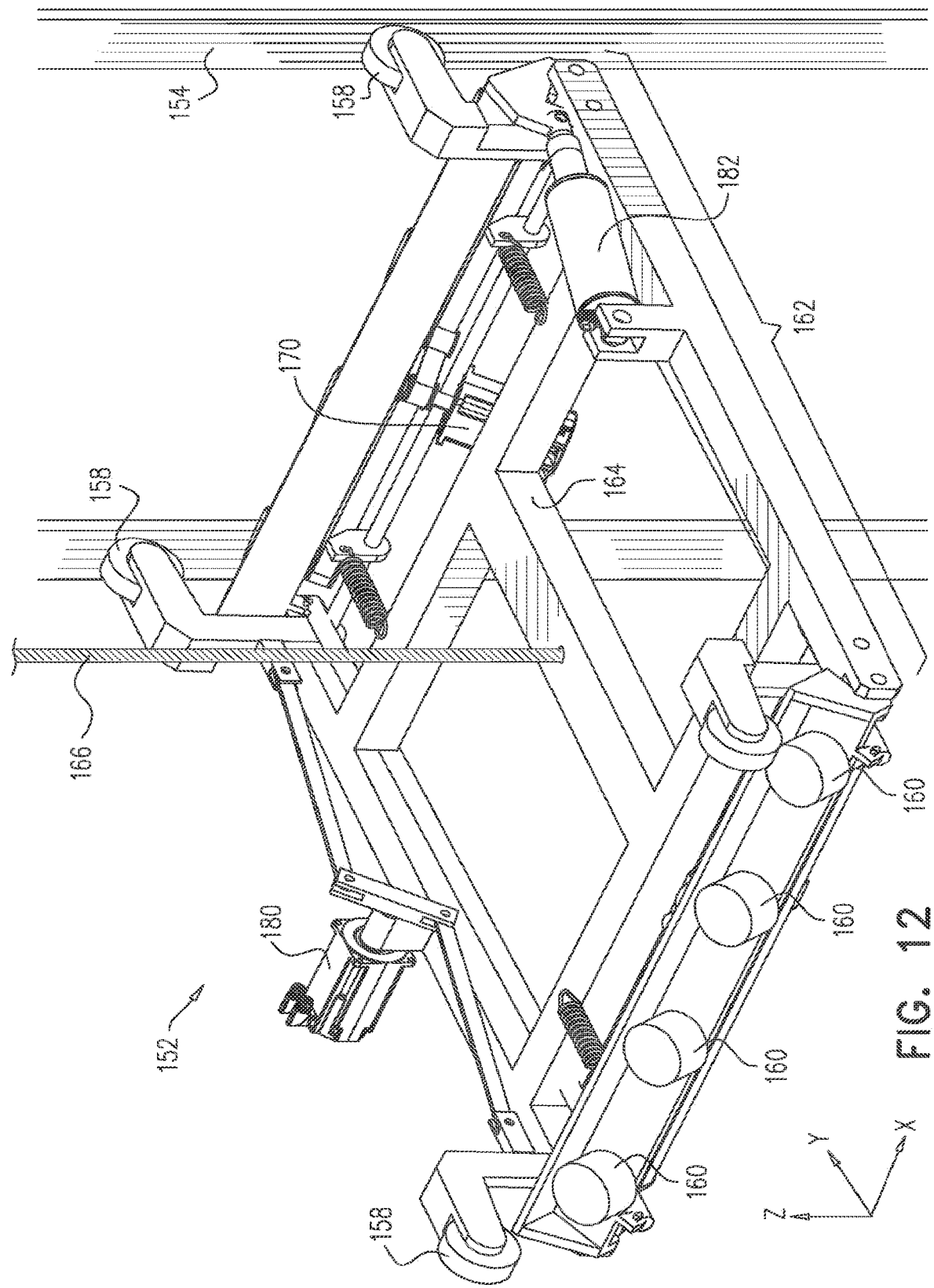
FIGS. 12 and 13 are schematic pictorial illustrations showing details of the robot of FIG. 11, in vertical and horizontal travel configurations, respectively, in accordance with an embodiment of the invention.
Figure 13:
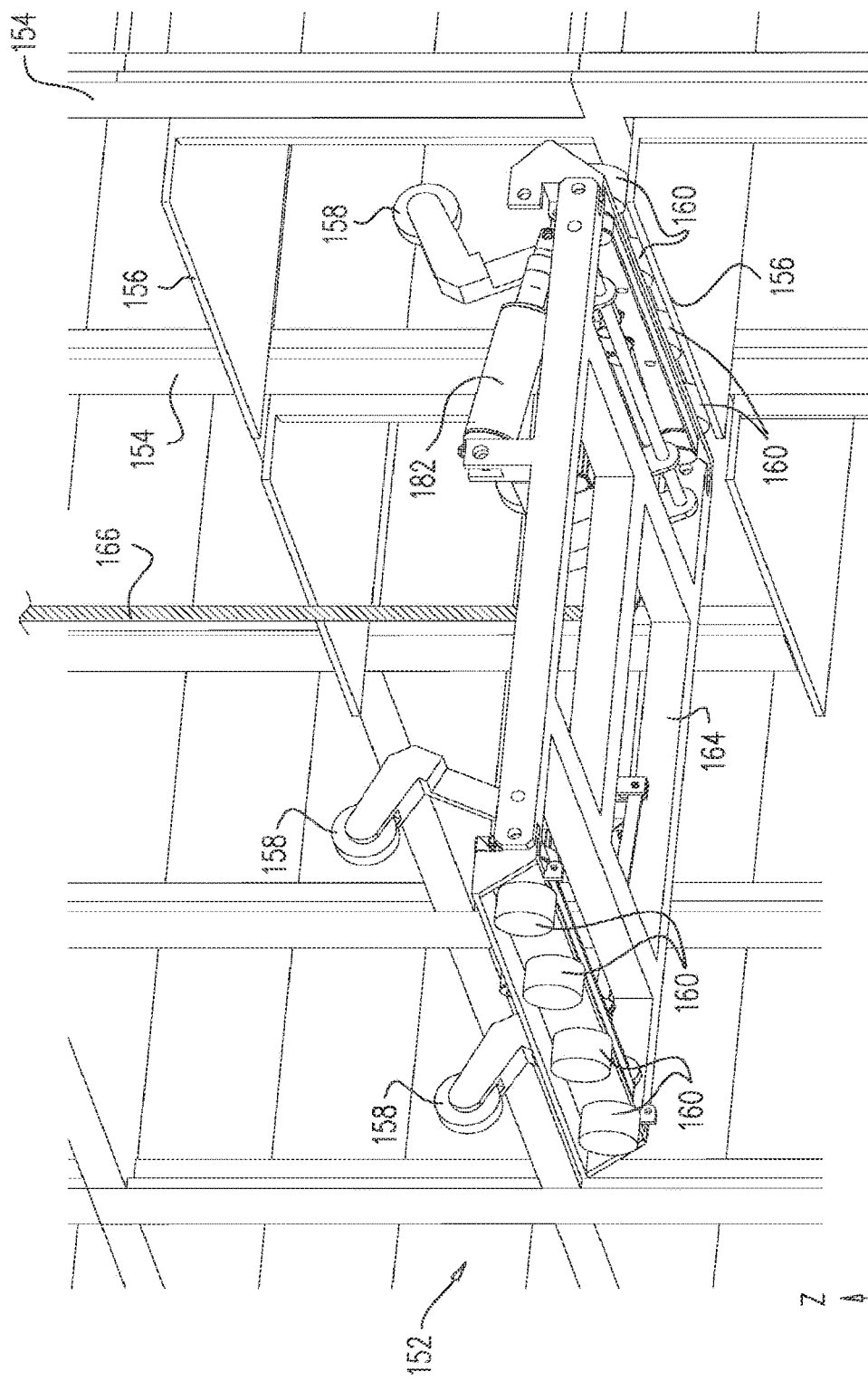

Reference is now made to FIGS. 11-13, which schematically illustrate a system 150 comprising shelving units 22 and a robot 152 for transport of containers 30 along paths over a vertical face of the shelving units, in accordance with yet another embodiment of the invention. FIG. 11 is a pictorial overview of system 150, while FIGS. 12 and 13 show details of robot 152 in vertical and horizontal modes of travel, respectively. As in the preceding embodiments, robot 152 travels along vertical and horizontal paths in gap 34 between adjacent shelving units 22; but the shelving unit to the left side of the robot is omitted from the figures for the sake of simplicity and visual clarity, as are elements of the frame of robot 152. Alternatively, system 150 can be arranged so that robot 152 travels against the vertical face of only a single shelving unit, located on one side of the robot, while the other side of the gap is defined by a wall or some other framework.

System 150 comprises a framework of vertical rails 154 and horizontal rails 156, which are deployed on the vertical face of shelving unit 22 (typically with a similar framework on the other side of gap 34). In the pictured example, horizontal rails 156 extend from respective front edges of shelves 28, while vertical rails 154 extend from vertical struts 88 between the shelves. Rails 154 and 156 may have any profile suitable to enable wheels 158 and 160 of robot 152 to engage and roll against them securely.

Robot 152 comprises a frame 162, which is configured to transport items to and from shelves 28 and includes a suitable container holder and puller arm (as shown in the preceding figures, but omitted here for the sake of simplicity). Frame 162 comprises a chassis 164, on which a transport mechanism is mounted, including wheels 158, 160, and a cable 166, which connects frame 162 to a winch 168. Two sets of wheels 158 and of wheels 160 are respectively connected on opposing sides of frame 164, with wheels 158 oriented vertically to engage vertical rails 154 for travel along vertical paths, and wheels 160 oriented horizontally to engage horizontal rails 156 for travel along horizontal paths. One or more motors 170 (one of which is shown in FIG. 12) drive wheels 160 so as to propel the frame along the horizontal paths, while winch 168 winds cable 166 in and out in order to raise and lower frame 162 along the vertical paths.

In the embodiment that is shown in FIG. 11, winch 168 is suspended above gap 34 and travels on a rail 172 (or other suitable suspension) along the length of the gap as robot 152 travels along horizontal paths in the gap, propelled by a transport motor 176, for example. A lift motor 178 drives winch 168 to wind and unwind cable 166. Although only a single winch 168 and robot 152 are shown in FIG. 11, multiple robots with corresponding winches may be deployed along the length of gap 34. Alternatively, the winch may be mounted in a fixed location, with a suitable system of pulleys, for example, along the run of cable 166.

In general, either wheels 158 or wheels 160 engage respective rails 154 or 156 at any given time while robot 152 is in motion, while the other set of wheels is disengaged, depending upon the current direction of travel of the robot. Actuators 180 and 182 engage and disengage the wheels as required. Thus, in the vertical motion configuration shown in FIG. 12, actuator 180 has advanced vertical wheels 158 to engage vertical rails 154, while actuator 182 has disengaged horizontal wheels 160 from horizontal rail 156 to allow robot 152 to travel along a vertical path, under the control of winch 168. In the horizontal motion configuration shown in FIG. 13, actuator 182 has engaged wheels 160 to roll along horizontal rail 156, while vertical wheels 158 have been disengaged.

Although certain particular designs of lift robots 66, 80, 120 and 152 have been shown and described above, the principles of system 20 may similarly be implemented using lift robots of alternative design, based on the sorts of propulsion mechanisms that are embodied in these lift robots or on other principles of propulsions that will be apparent to those skilled in the art after reading the above description. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A lift robot configured to travel along vertical and horizontal paths in a predefined gap between first and second shelving units elevated above a floor, wherein the lift robot is configured to transfer items to and from the first and second shelving units at least by traveling along the vertical and horizontal paths, wherein the first and second shelving units are mounted over the floor, wherein the first and second shelving units comprise vertical arrays of shelves and are arranged side by side with the predefined gap between the respective vertical faces, wherein the lift robot is capable of moving horizontally in the horizontal paths while being suspended above the floor, wherein said lift robot comprises:
a frame configured to transport the items to and from the shelves;
first and second sets of pinions, which are configured to engage vertical and horizontal toothed racks in first and second frameworks, respectively; and
at least one motor, which is configured to drive the pinions so as to propel the frame along the vertical and horizontal paths
wherein the lift robot is configured to transfer the items between the shelves and a plurality of floor robots traveling on the floor below the lift robot, wherein said transfer comprises releasing an item to a floor robot of the plurality of floor robots located below the lift robot.

2. The lift robot according to claim 1, wherein the frame comprises at least one puller arm, which is configured to extend through the first and second frameworks and to draw the items from the shelves into the frame for transport.

3. The lift robot according to claim 1, wherein each of the first and second sets of pinions comprises at least first and second pinions, which are attached respectively to opposing sides of the frame and are configured to rotate along respective first and second parallel segments of the vertical and horizontal toothed racks.

4. The lift robot according to claim 1, wherein each of the first and second sets of pinions comprises at least one pair of first and second pinions, which are rotatable between a vertical configuration in which the first pinion is positioned vertically above the second pinion for travel along the vertical toothed racks and a horizontal configuration in which the first and second pinions are positioned horizontally side by side for travel along the horizontal toothed racks.

5. The lift robot according to claim 4, wherein the first and second pinions comprise respective first and second shafts, and wherein each of the first and second sets of pinions comprises a joint, which is connected to the shafts and is configured to rotate the shafts between the vertical and horizontal configurations.

6. The lift robot according to claim 5, wherein the joint comprises a brake, which is configured to lock the shafts in each of the vertical and horizontal configurations, respectively, during the travel along the vertical and horizontal toothed racks, and to release the shafts for rotation between the vertical and horizontal configurations at points of transition between the vertical and horizontal paths.

7. The lift robot according to claim 5, wherein the first and second frameworks comprise curved transition rack segments at corners in the framework where the vertical and horizontal toothed racks intersect, and wherein the first and second pinions are configured to rotate about the joint at the corners so as to engage the curved transition rack segments at points of transition between the vertical and horizontal paths.

8. The lift robot according to claim 1,
wherein the first set of pinions comprises two pairs of pinions, each of which comprising two pinions having a predetermined distance therebetween,
wherein the second set of pinions comprises two addition pairs of pinions, each of which comprising two pinions having the predetermined distance therebetween.

9. The lift robot according to claim 1, wherein the lift robot is capable of moving horizontally in at least three parallel horizontal paths at different heights while being suspended above the floor.

10. The lift robot according to claim 1, wherein the vertical and horizontal toothed racks comprise a plurality of curved transition segments at intersections of the vertical toothed racks with the horizontal toothed racks, wherein at least three curved transitions are positioned one above the other.

11. A system comprising:
the lift robot according to claim 1; and
the first and second shelving units.

12. The system of claim 11, wherein the horizontal toothed racks are fixed to respective front edges of the shelves, while the vertical toothed racks are fixed to vertical struts extending between the shelves.

13. The system according to claim 11, further comprising plurality of floor robots configured to travel on the floor, wherein the lift robot is configured to transport the items to and from the plurality of floor robots.

* * * * *